June 17, 1930. H. W. INGLE 1,764,791
CONVEYER DRIVE FOR GLASS ANNEALING LEERS
Filed Jan. 29, 1927 2 Sheets-Sheet 1
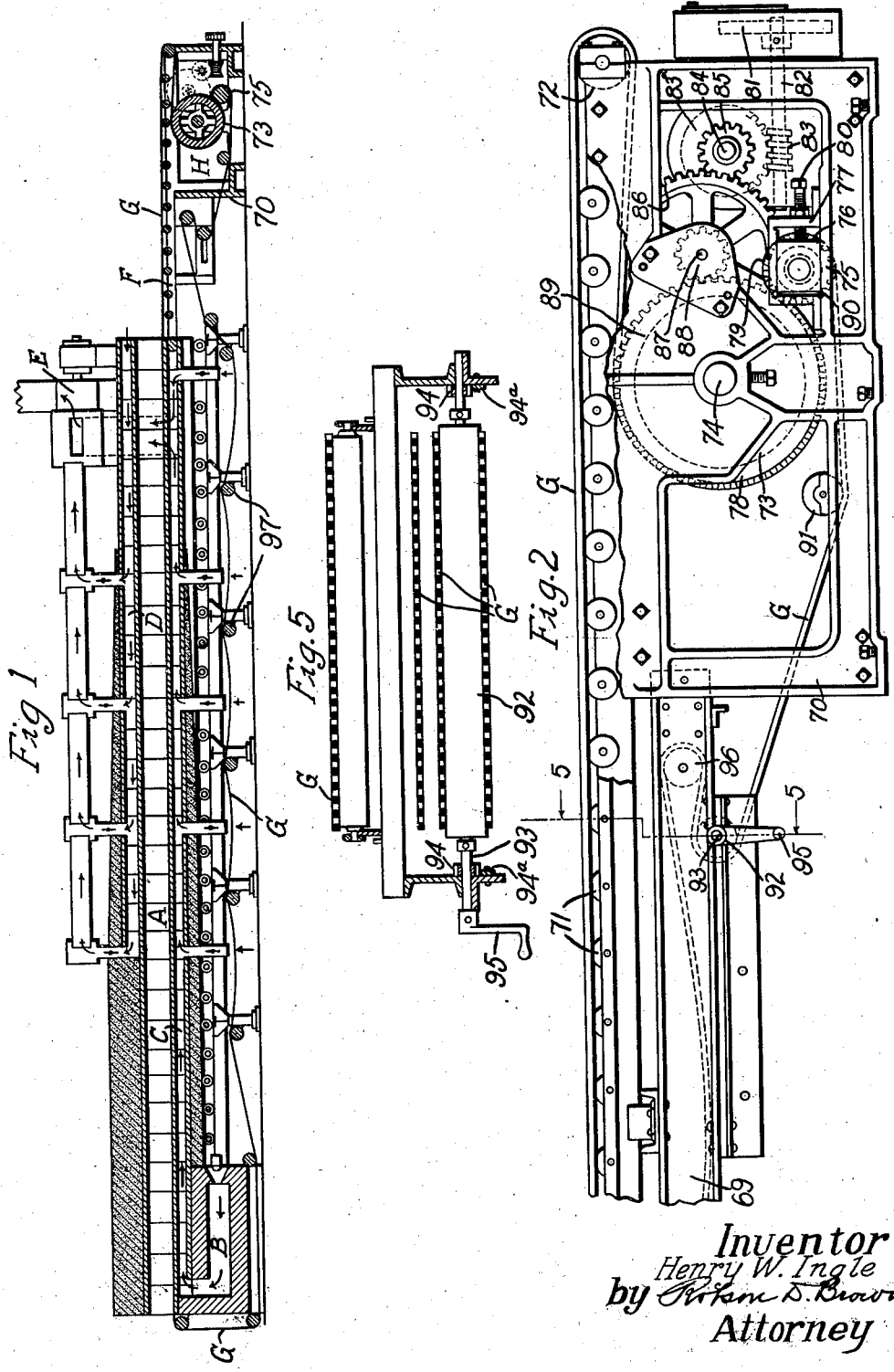
Inventor
Henry W. Ingle
by
Attorney

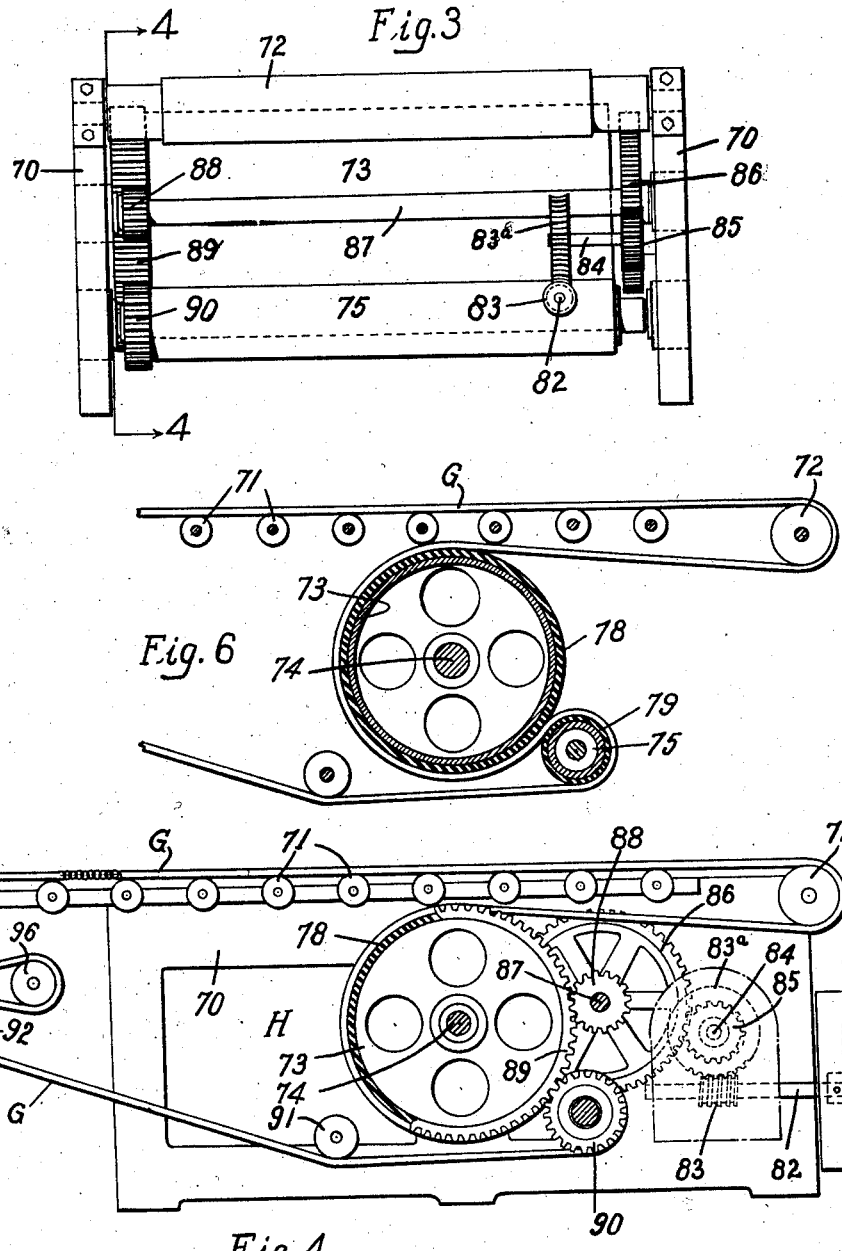

Patented June 17, 1930

1,764,791

UNITED STATES PATENT OFFICE

HENRY W. INGLE, OF WEST HARTFORD, CONNECTICUT, ASSIGNOR TO HARTFORD-EMPIRE COMPANY, OF HARTFORD, CONNECTICUT, A CORPORATION OF DELAWARE

CONVEYER DRIVE FOR GLASS-ANNEALING LEERS

Application filed January 29, 1927. Serial No. 164,457.

This invention relates to apparatus for annealing glassware and it has particular relation to leers of the type embodying a heated tunnel through which ware is transported by an endless conveyer of woven wire fabric and in which the ware is subjected to suitable temperature environments in order to first relieve stresses and strains existing therein, and then to cool the ware so that additional strains will not be set up. Such an apparatus is disclosed in the Mulholland Patent No. 1,560,481 of the Hartford-Empire Company, dated November 3, 1925.

In glass annealing leers employing an endless belt conveyer of woven wire fabric which is maintained in operative engagement with a driving drum or roll by means of a take-up or tightening roller in the slack strand, difficulty is encountered in maintaining the proper frictional contact between the conveyer and the driving drum or roll under changing temperatures. This is by reason of the fact that the tightening roll causes tension in both the ware bearing strand and the idle or return strand of the conveyer and as a result, when the leer is initially placed in operation, the belt, as it lengthens with the rising temperature of the tunnel, has a tendency to slip on the driving drum unless the take-up roll is adjusted from time to time to maintain the necessary slack side tension. Conversely, when the operation of the leer is discontinued, there is a tendency for the conveyer to become unduly stressed as it shortens with the lowering temperatures of the tunnel, unless the tightening roll is loosened. This variable tension on the conveyer is not easily observed and there is a possibility that the operator will not remedy conditions by suitable adjustment of the tightening roll until slippage actually occurs or until the belt is unduly stretched.

Moreover, the load imposed on the conveyer belt in any given cross-section in that portion of the tunnel, where the conveyer by reason of its high temperature is relatively plastic and most likely to become stretched if overloaded, is equal to the initial tension necessary to maintain suitable frictional contact with a driving drum, plus the tension necessary to overcome the friction between the idle or return strand of the conveyer and its supports, plus the tension necessary to overcome the friction caused by the load on that portion of the ware-bearing strand of the conveyer located between the section of the conveyer under consideration and the point of loading and the floor of the tunnel. The friction between the idle strand of the conveyer and its supports is small, being the result of its weight alone, and the friction caused by the load on the portion of the ware-bearing strand of the conveyer located between the section under discussion and the point of loading, is also relatively small, being the result of the weight of only a small portion of the total weight of the ware being transported through the tunnel. However, by reason of the fact that the area of contact between the drum and the conveyer is relatively small in comparison to the area of contact between both the ware bearing and the idle strands of the conveyer and their supports, the friction between the driving drum and the conveyer must be relatively great in order to maintain suitable driving contact therebetween. To maintain this friction the tension placed on the conveyer belt must be relatively great. It will, therefore, be apparent that it is this latter tension that causes the greatest tendency for the conveyer to become stretched in that section of the tunnel where it is subjected to the highest temperature.

One of the objects of the present invention is to avoid the disadvantages above described by providing a driving mechanism for a conveyer of the woven wire type having a plurality of drums or rolls adapted to grip the conveyer therebetween and draw the ware-bearing strand of the conveyer through the tunnel by tension exerted directly on such portion of the conveyer, thus not only maintaining a constant tension on the ware-bearing strand of the conveyer independently of the expansion or the contraction thereof with changes in temperature without the utilization of tightening rolls for the accomplishment of such purpose, but entirely eliminating the initial tension exerted on the idle strand of the conveyer inherent to driving mechanisms employing such rolls, and as a consequence, lessening the tendency to stretch the conveyer in that portion of the tunnel where it is the hottest and most plastic.

Other objects will appear from the following description.

In the accompanying drawings:

Figure 1 is a diagrammatic vertical longitudinal sectional view of a leer constructed according to the invention;

Fig. 2 is an enlarged side elevational view of the conveyer driving mechanism;

Fig. 3 is an end elevational view of the structure illustrated in Fig. 2;

Fig. 4 is a vertical longitudinal sectional view through the conveyer driving mechanism taken on line 4—4 of Fig. 3;

Fig. 5 is a vertical transverse sectional view taken on line 5—5 of Fig. 2 and illustrating the construction of the mechanism for taking up excess slack in the idle strand of the conveyer belt; and Fig. 6 is a diagrammatical vertical longitudinal sectional view through the driving drum and binding roll.

Referring to the drawings, the invention is diagrammatically illustrated in Fig. 1 as comprising a sectional tunnel A; a fire box B, located beneath the forward or ware-receiving end of the tunnel; a plurality of heating flues C, communicating with a fire box and extending longitudinally beneath the tunnel; a plurality of cooling flues D, extending longitudinally above the tunnel; a draft producing device E, specifically a suction fan located above the exit end of the tunnel and communicating with both the heating flues and the cooling flues; a ware sorting table F, located at the exit end of the tunnel; an endless conveyer G, of open work or wire mesh fabric, the ware-bearing strand of which traverses the tunnel and the sorting table F, and the idle strand of which returns to the entrance end of the tunnel beneath the leer; and a conveyer driving mechanism H.

The conveyer driving mechanism H, which is the subject of the present invention, is mounted in a frame 70 which also constitutes the support for the frame 69 of the sorting table F. The conveyer G, as it emerges from the tunnel, traverses the sorting table F where it is supported by a plurality of spaced rollers 71. Upon reaching the end of the sorting table, the conveyer passes over a roller 72 journaled in the frame 70, and thence forwardly and around a driving drum 73 which is mounted on a shaft 74 journaled in the frame 70. At the point where the conveyer leaves the drum 73, it passes over and rearwardly around a binding roll 75 which is journaled at its end in slide blocks 76, mounted in ways 77, and which, together with the drum 73, positively grips the conveyer therebetween. The drum 73 and the roller 75 are provided with resilient anti-slipping coverings 78 and 79 respectively, composed of rubber or the like, so as to present a yielding tractive surface to the fabric of the conveyer and to insure a positive gripping contact therewith. The roller 75 is maintained in gripping contact with the conveyer belt G by jack screws 80 which are threaded in the ways 77 and which bear against the slide blocks 76.

The drum 73 and the binding roll 75 are rotated by a sprocket wheel 81 which is driven in any preferred manner. The sprocket wheel 81 is mounted on a shaft 82 which carries a worm 83 meshing with a worm wheel 83ᵃ carried by a shaft 84. A pinion 85 is also fixed to the shaft 84 and meshes with a gear wheel 86 mounted on a shaft 87. A pinion 88 is also keyed to the shaft 87 and meshes with a gear wheel 89 fixed to the drum 73. The gear wheel 89 meshes with a gear wheel 90 fixed to the roller 75 whereby both the drum and the roller are driven at the same peripheral speed.

The conveyer belt G, after passing around the roller 75, passes forwardly and beneath a roller 91, and thence upwardly and rearwardly over a take-up roller 92. The take-up roller 92 is mounted on a shaft 93 provided with gear wheels 94 at each end, which are mounted on rack bars 94ᵃ carried by the bars 69 which constitute the framework of the sorting table F. By rotating the shaft 93 by means of a handle 95, the roller 92 may be shifted longitudinally of the table F to take up any excess slack in the conveyer. After leaving the roller 93, the conveyer belt G passes upwardly and forwardly over a roller 96 journaled in the bars 69, and thence forwardly beneath the leer tunnel where it is supported at intervals by rollers 97 which are mounted on the pedestals which support the leer.

It will be apparent from the foregoing that I have provided a very rugged and positive driving mechanism for a conveyer of the woven wire type and one that will maintain the proper tension on the belt under all normal operating conditions and independently of any tension exerted by the take-up roll 92, this roll being employed solely for the purpose of taking up excess slack in the conveyer belt developed through permanent elongation due to wear, and not for the purpose of causing the belt to frictionally engage the driving drum 73.

Any temporary elongation or shortening in the length of the belt is accommodated by the catenaries between the rollers 97 (Fig. 1) which support the idle strand of the conveyer.

The roller 75 is arranged so that it maintains the conveyer in engagement with a major portion of the periphery of the drum 73, thus materially increasing the area of contact between the conveyer and the drum and the degree of friction therebetween.

The illustrated embodiment of the invention may be modified in construction and arrangement without departing from the scope of the invention as defined in the appended claims.

I claim as my invention:

1. The combination with a conveyer of woven wire fabric for transporting articles of glassware, of a drum of relatively large diameter provided with a resilient anti-slipping covering for driving said conveyer and a roller for maintaining said conveyer in contact with said drum through a major portion of the periphery thereof, said drum and said roller being both positively driven, whereby to provide a large surface of driving contact for said conveyer.

2. The combination with a conveyer of woven wire fabric for transporting articles of glassware, of a drum of relatively large diameter, provided with a resilient anti-slipping covering for driving said conveyer, and the roller disposed remote from the line of tangency of said conveyer and said drum for maintaining said conveyer in driving engagement with that portion of the conveyer engaging surface of said drum located between said roller and said line of tangency, said drum and said roller being positively driven, whereby to provide a large surface of driving contact for said conveyer.

3. The combination with an endless conveyer of wire mesh fabric for transporting articles of glassware, of a plurality of rolls for driving said conveyer and adapted to grip said conveyer therebetween, means for adjusting the rolls toward and away from one another, whereby tension is exerted on the ware-bearing strand of said conveyer without exerting tension on the slack or idle strand thereof, and means for driving said rolls, whereby to provide a large surface of driving contact for said conveyer.

4. The combination with an endless conveyer of wire mesh fabric for transporting glassware, of a plurality of rolls for driving said conveyer and adapted to grip the conveyer therebetween, slide bearings for one of said rolls, means for adjusting a portion of said bearings to regulate the force with which the rolls grip said conveyer, and means for driving said rolls, whereby to provide a large surface of driving contact for said conveyer.

5. The combination with an endless conveyer adapted for transporting glassware through a glass annealing leer, of a plurality of rollers for driving said conveyer and adapted to grip the conveyer therebetween, intermeshing gear wheels carried by said rollers for causing said rollers to rotate at the same peripheral speed, and means for applying power to both of said rollers.

6. The combination with an endless conveyer for transporting glassware through a glass annealing leer, of a driving drum of relatively large diameter and a roll of relatively small diameter located at the discharge end of said conveyer and adapted to grip the conveyer therebetween, and means for driving said drum and roller at the same peripheral speed to draw the ware-bearing strand of the conveyer through the leer under tension exerted only on the ware-bearing strand of said conveyer.

Signed at Hartford, Conn., this 27th day of January, 1927.

HENRY W. INGLE.